United States Patent Office 2,773,887
Patented Dec. 11, 1956

2,773,887

PREGNANE-11α,17α-DIOL-3,20-DIONES, ESTERS THEREOF AND PROCESS

George Rosenkranz, Mexico City, Mexico, and Carl Djerassi, Birmingham, Mich., assignors, by mesne assignments, to Syntex S. A., Mexico City, Mexico, a corporation of Mexico No Drawing. Application February 17, 1953, Serial No. 337,431

Claims priority, application Mexico February 19, 1952

6 Claims. (Cl. 260—397.45)

The present invention relates to novel cyclopentanophenanthrene derivatives and to a novel method for the preparation thereof.

More particularly, the present invention relates to novel pregnan-11α,17α-diol-3,20-dione compounds such as the free alcohols and esters and especially allopregnan-11α,17α-diol-3,20-dione and the 11 mono esters thereof, and to a novel method for the preparation of these compounds as well as novel intermediates for the preparation thereof.

The novel compounds of the present invention are useful intermediates for the preparation of cortical hormones. For example, allopregnan-11α,17α-diol-3,20-dione or the 11-mono ester thereof may be dibrominated to form the 2,4-dibromo derivative, which may then be treated with sodium iodide to form the corresponding 2-iodo-Δ⁴ compound and the 2-iodo group eliminated as by treatment with zinc dust to form the 11α-hydroxy analogue of the cortical hormone 17α-hydroxy-progesterone which differs from the cortical hormone cortisone only in the absence of the 21-hydroxy group and the presence of an 11α-hydroxy group. Since the 11α-hydroxy group is readily oxidizable to the 11-keto group by a suitable oxidizing agent such as chromic acid, etc., and the 21-hydroxy group may also be produced by known methods as for example bromination, treatment with sodium iodide followed by treatment with sodium acetate, it is evident that the compounds of the present invention are desirable and important intermediates.

In accordance with the present invention, therefore, it has been discovered that Δ¹⁶-allopregnen-3β,11α-diol-20-one which has been disclosed in our patent application No. 307,722, filed September 3, 1952, may be converted into various intermediates and finally into allopregnan-11α,17α-diol-3,20-dione and/or 11 esters thereof.

The following equation serves to illustrate a part of the process and certain of the novel intermediates of the present invention:

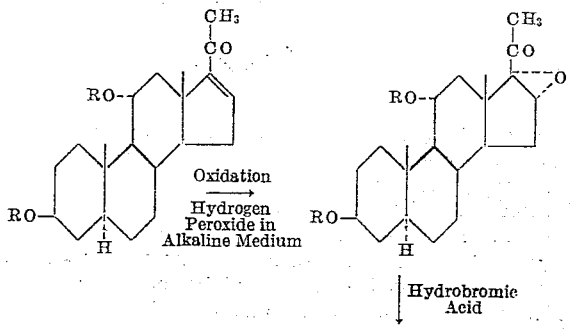

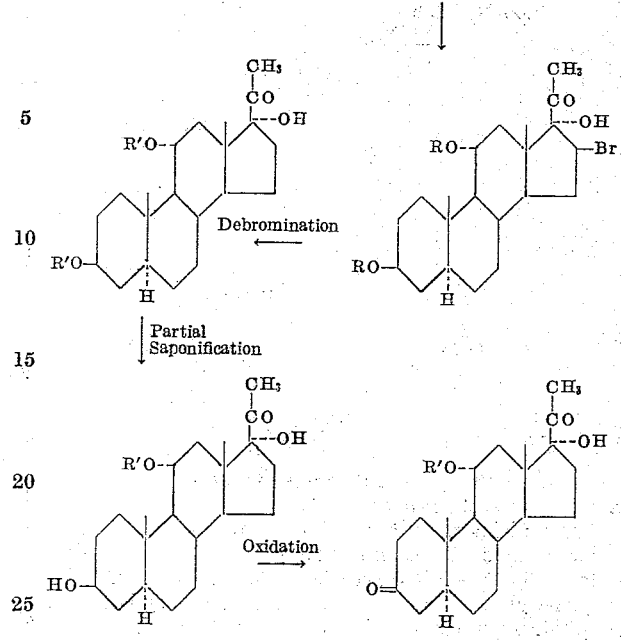

In the above equation R represents an acyl group or hydrogen. The acyl group may be the residue of any organic acid customarily used for the esterification of steroid alcohols and particularly the residue of a lower fatty acid such as acetic or propionic or an organic acid such as benzoic. R' represents an acyl group of the character just described.

In practicing the process just outlined Δ¹⁶-allopregnen-3β,11α-diol-20-one or a suitable diester thereof such as the diacetate is dissolved in a suitable organic solvent such as methanol and maintained at a temperature below room temperature, i. e., 20° C., while hydrogen peroxide and sodium hydroxide in water and methanol were added dropwise simultaneously thereto. The reaction solution was stirred for a short time and thereafter left overnight in a refrigerator. The precipitate of crude product produced on dilution with water, could be then acylated in a conventional way or completely saponified to produce respectively the diester of or free 16α,17α-oxido-allopregnan-3β,11α-diol-20-one.

For the second step of the process an acetic acid solution of the oxido-compound such as 16α,17α-oxido-allopregnan-3β,11α-diol-20-one diacetate was treated with hydrobromic acid in acetic under the conditions hereinafter described in detail to produce the corresponding bromohydrin, i. e., 16-bromo-allopregnan-3β,11α,17α-triol-20-one 3,11-diacetate. Refluxing of this bromohydrin with Raney nickel catalyst and alcohol produced allopregnan-3β,11α,17α-triol-20-one 3,11-diacetate.

The diacetate or other suitable ester prepared as just described upon partial saponification with approximately 1 molar equivalent of a mild saponifying agent such as an alkali metal bicarbonate, i. e., sodium bicarbonate produced corresponding 11 mono ester and oxidation of this mono ester with an oxidizing agent such as N-bromoacetamide produced the corresponding 11-mono ester of allopregnan-11α,17α-diol-3,20-dione.

Allopregnan-3β,11α,17α-triol-20-one 3,11 diesters or the free triol which may be readily diacylated thereto since the 17α-hydroxy group is difficult to acylate by ordinary procedures may also be prepared by the process outlined in the following equation:

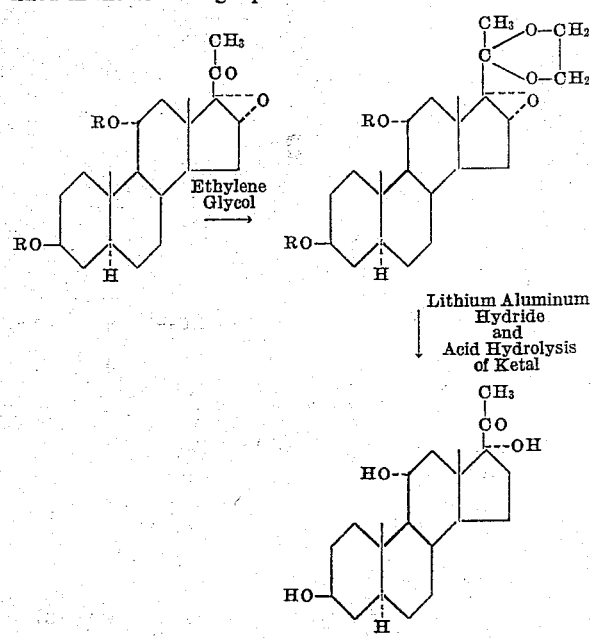

In the above equation R represents the same groups as hereinbefore set forth.

In practicing the process above outlined, the 16α,17α-oxido compound as for example 16α,17α-oxido-allopregnan-3β,11α-diol-20-one diacetate was refluxed with ethylene glycol in the presence of an acid catalyst such as p-toluenesulphonic acid to produce the corresponding ethylene ketal. The ketal was then treated with lithium aluminum hydride followed by acid hydrolysis as for example with p-toluenesulphonic acid to give allopregnan-3β,11α,17α-triol-20-one. Conventional acylation gave the corresponding 3,11 diester.

Instead of the methods hereinbefore described which involve the initial conversion of the 16α,17α-oxido group to a 17α-hydroxy group followed by a partial saponification of the 3,11-diester to an 11 mono ester and oxidation of the 3-hydroxy group to a keto group, it is within the scope of the present invention to first form the 3-keto group and thereafter form the 17α-hydroxy group. This modification of the present invention is illustrated by the following equation:

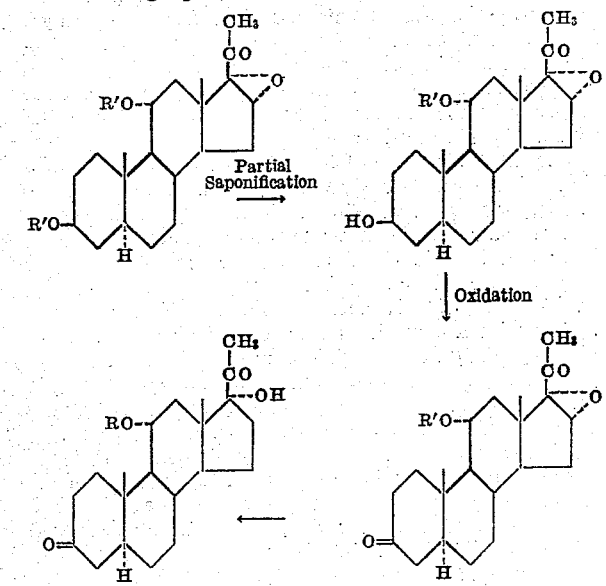

In the above equation R' and R indicate the same groups as hereinbefore outlined.

The partial saponification step may be performed with approximately 1 molar equivalent of a mild saponifying agent such as an alkali metal bicarbonate, i. e., sodium bicarbonate. For the oxidation of the 3-hydroxy group to the 3-keto group a relatively mild oxidizing agent may be used such as N-bromoacetamide, chromic acid, or aluminum t-butylate, isopropylate or phenolate in the presence of a hydrogen acceptor. The resultant 16α,17α-oxido-allopregnan-11α-ol-3,20-dione 11-mono ester could then be converted into the same allopregnan-11α,17α-diol-3,20-dione 11-mono ester or free compound by the methods previously outlined for converting the 16α,17α-oxido group into the 17α-hydroxy group. These methods are illustrated by the following equations:

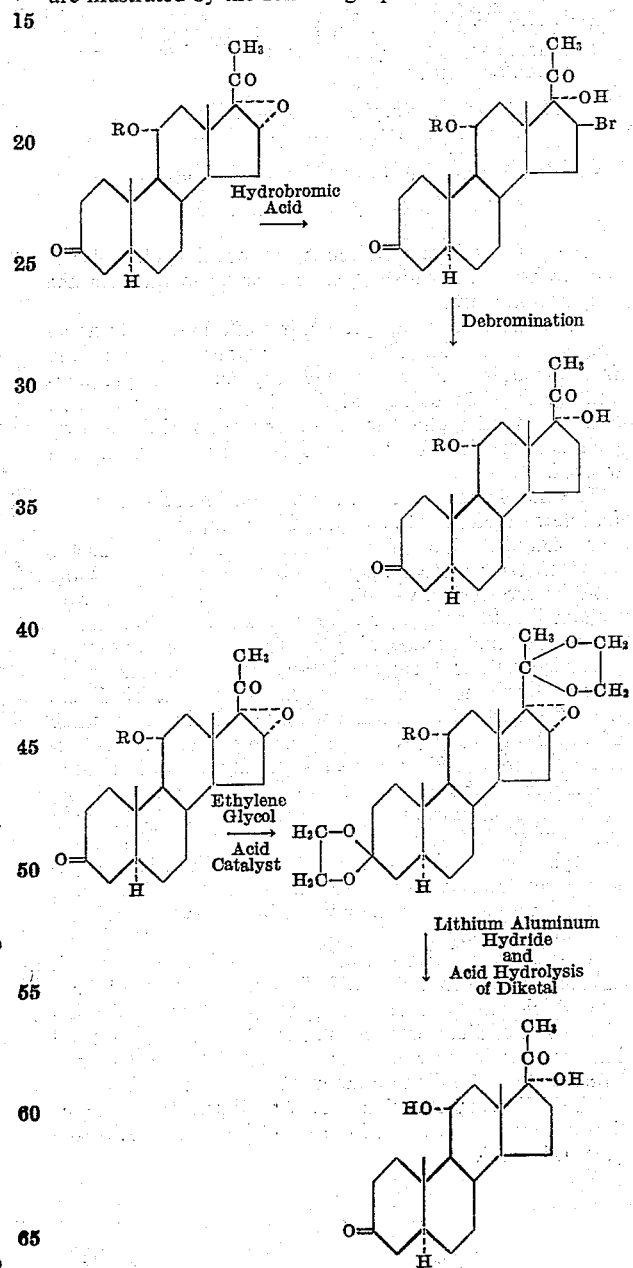

In the above equations R' and R indicate the same groups as hereinbefore outlined. It may be further noted that although the reactions are similar to those previously described, as indicated in the second of the above equations, the 3,20-bis-ethylene ketal of 16α,17α-oxido-allopregnan-11α-ol-3,20-dione or its 11-mono ester is formed in order to protect both the 3 and 20 keto groups from reduction by the lithium aluminum hydride.

The following specific examples serve to illustrate but are not intended to limit the present invention:

*Example I*

5 cc. of 30% hydrogen peroxide and a solution of 1.15 g. of sodium hydroxide in 5 cc. of water and 13 cc. of methanol were added simultaneously dropwise from two separatory funnels to a solution of 2.5 g. of $\Delta^{16}$-allopregnen-3$\beta$,11$\alpha$-diol-20-one or its diacetate in 200 cc. of methanol maintaining the temperature below 20° C. After stirring one hour at room temperature the solution was left overnight in the refrigerator and then diluted with water. The precipitate was collected and the crude product was acetylated with acetic anhydride and pyridine in the usual way. Crystallization from methanol yielded 16$\alpha$,17$\alpha$ - oxido - allopregnan-3$\beta$,11$\alpha$-diol-20-one diacetate with a melting point of 72° C., $[\alpha]_D \pm 0$ (chloroform).

Alternatively, the crude reaction product was completely saponified by boiling its methanolic solution during 30 minutes with 2% methanolic potassium hydroxide, followed by dilution with water and filtration of the precipitate. Recrystallization gave the free 16$\alpha$,17$\alpha$-oxido-allopregnan-3$\beta$,11$\alpha$-diol-20-one with a melting point of 98°–100° C., $[\alpha]_D + 31°$ (chloroform).

*Example II*

A solution of 10 g. of 16$\alpha$,17$\alpha$-oxido-allopregnan-3$\beta$,11$\alpha$-diol-20-one diacetate in 100 cc. of acetic acid was treated with 10 cc. of a 32% solution of hydrobromic acid in acetic acid. The mixture was left standing during 30 minutes and then 10 cc. more of the hydrobromic acid solution were added, followed by 30 minutes standing. The mixture was poured into water and extracted with ether. The ether solution was well washed with water to eliminate all the acid, dried over sodium sulphate and evaporated to dryness under vacuum to give 16-bromo-allopregnan-3$\beta$,11$\alpha$,17$\alpha$-triol-20-one 3,11-diacetate. This bromohydrin was refluxed during 5 hours with 370 cc. of alcohol and 50 g. of Raney nickel catalyst. After filtering the catalyst, the solution was evaporated and the residue was crystallized from acetone-hexane to yield allopregnan-3$\beta$,11$\alpha$,17$\alpha$-triol-20-one 3,11-diacetate with a melting point of 180°–181° C.; $[\alpha]_D -28°$ (chloroform).

*Example III*

10 g. of 16$\alpha$,17$\alpha$-oxido-allopregnan-3$\beta$,11$\alpha$-diol-20-one diacetate were dissolved in 450 cc. of benzene and 10 cc. of ethylene glycol, and 100 cc. of solvent were distilled in order to remove traces of moisture. 800 mg. of p-toluenesulphonic acid were added and the mixture was refluxed during 12 hours in an apparatus equipped with a water separator. The solution was diluted with ether containing 10 drops of pyridine and then was well washed with sodium bicarbonate and water, dried over sodium sulphate and evaporated to dryness. The residue was crystallized from hexane-ether thus giving the ethylene ketal of 16$\alpha$,17$\alpha$-oxido-allopregnan-3$\beta$,11$\alpha$-diol-20-one diacetate.

*Example IV*

A solution of 1 g. of lithium aluminum hydride in 70 cc. of ether was added dropwise to a solution of 1 g. of the ethylene ketal of 16$\alpha$,17$\alpha$-oxido-allopregnan-3$\beta$,11$\alpha$-diol-20-one diacetate in 100 cc. of anhydrous ether. The mixture was refluxed during 1 hour and then acetone was added to destroy the excess of hydride. The solution was washed with dilute hydrochloric acid, sodium carbonate and water, dried over sodium sulphate and evaporated. The residue was treated with 50 cc. of acetone and 350 mg. of p-toluenesulphonic acid. After 24 hours at room temperature the hydrolysis of the ketal was complete and the solution was diluted with water. The precipitate was filtered and washed, giving allopregnan-3$\beta$-11$\alpha$,17$\alpha$-triol-20-one with a melting point of 193°–195° C.

Acetylation with acetic anhydride in pyridine solution afforded the diacetate, identical to the one described in Example II.

*Example V*

1 g. of 16$\alpha$,17$\alpha$-oxido-allopregnan-3$\beta$,11$\alpha$-diol-20-one diacetate was refluxed during 30 minutes with alcohol and an aqueous solution of 1.1 molar equivalents of sodium bicarbonate. The mixture was poured in water and the product was extracted with ether, washed, dried and evaporated to dryness. Recrystallization from hexane-acetone gave 16$\alpha$,17$\alpha$-oxido-allopregnan-3$\beta$,11$\alpha$-diol-20-one 11-monoacetate.

*Example VI*

A solution of 1 g. of 16$\alpha$,17$\alpha$-oxido-allopregnan-3$\beta$,11$\alpha$-diol-20-one 11-monoacetate in pyridine was treated with 450 mg. of N-bromoacetamide added in small portions and maintaining the temperature at around 20° C. After standing overnight it was diluted with water, and the product was extracted with ether, washed with dilute hydrochloric acid, sodium bicarbonate and water, dried over sodium sulphate and evaporated to dryness. Crystallization from ethyl acetate yielded 16$\alpha$,17$\alpha$-oxido-allopregnan-11$\alpha$-ol-3,20-dione acetate with a melting point of 170°–172° C., $[\alpha]_D + 35.15°$ (chloroform).

*Example VII*

A solution of 250 mg. of chromic acid in 0.5 cc. of water and 5 cc. of acetic acid was added dropwise at room temperature to a solution of 1 g. of 16$\alpha$,17$\alpha$-oxido-allopregnan-3$\beta$,11$\alpha$-diol-20-one 11-monoacetate in 40 cc. of glacial acetic acid and the solution was left standing 2 hours at room temperature. It was then poured into water and the precipitate was filtered and washed. Crystallization from ethyl acetate afforded 16$\alpha$,17$\alpha$-oxido-allopregnan-11$\alpha$-ol-3,20-dione acetate, identical to the one obtained according to Example VI.

*Example VIII*

0.98 g. of 16$\alpha$,17$\alpha$-oxido-allopregnan-3$\beta$,11$\alpha$-diol-20-one 11-monoacetate were dissolved in a mixture of 150 cc. of anhydrous toluene and 15 cc. of cyclohexanone and 40 cc. of solvent were distilled in order to remove traces of moisture. To the refluxing solution 1.5 g. of aluminum isopropylate in 50 cc. of anhydrous toluene were added in the course of 40 minutes. During this time a slow distillation was maintained. 20 cc. of a concentrated aqueous solution of sodium-potassium tartrate were added to the cooled reaction mixture and it was then subjected to steam distillation until complete removal of the volatile components. The residue from the distillation was extracted with ether, washed with water, dried over sodium sulphate and evaporated to dryness. Recrystallization from ethyl acetate afforded the same 16$\alpha$,17$\alpha$-oxido-allopregnan-11$\alpha$-ol-3,20-dione acetate as in the two previous examples.

0.7 g. of this acetate were refluxed during half an hour with 5% methanolic potassium hydroxide. The mixture was diluted with water and the precipitate was collected and washed to neutral. The air-dried precipitate was recrystallized from ether-acetone thus giving the free 16$\alpha$,17$\alpha$-oxido-allopregnan-11$\alpha$-ol-3,20-dione with a melting point of 200°–203° C., $[\alpha]_D + 65.5°$ (chloroform).

*Example IX*

A solution of 1 g. of 16$\alpha$,17$\alpha$-oxido-allopregnan-11$\alpha$-ol-3,20-dione acetate such as obtained according to Examples VI, VII, or VIII in 50 cc. of benzene was treated with ethylene glycol by the method described in Example III. It gave the 3,20-bis-ethyleneketal of 16$\alpha$,17$\alpha$-oxido-allopregnan-11$\alpha$-ol-3,20-dione acetate.

*Example X*

1 g. of the 3,20-bis-ethyleneketal of 16$\alpha$,17$\alpha$-oxido-allopregnan-11$\alpha$-ol-3,20-dione acetate, such as obtained by the method described in Example IX was treated according to the method described in Example IV, first with lithium aluminum hydride and then with p-toluenesulphonic acid in acetone. Allopregnan-11α,17α-diol-3,20-dione was obtained with a melting point of 218°–220° C., $[\alpha]_D +5.81°$ (chloroform).

Acetylation of this compound with acetic anhydride and pyridine, heating one hour on the steam bath gave allopregnan-11α,17α-diol-3,20-dione 11-acetate with a melting point of 196°–198° C., $[\alpha]_D -3.92°$ (chloroform).

Example XI

A solution of 16α,17α-oxido-allopregnan-11α-ol-3,20-dione acetate in acetic acid was treated with a solution of hydrobromic acid in acetic acid under the conditions described in Example II to give the corresponding bromohydrin acetate. The debromination of the acetate by the method described in Example II formed allopregnan-11α,17α-diol-3,20-dione 11-acetate identical to the one obtained according to Example X.

Example XII

Allopregnan-3β,11α,17α-triol-20-one diacetate was saponified with sodium bicarbonate according to the method described in Example V to form the 11-monoacetate of allopregnan-3β,11α,17α-triol-20-one.

Example XIII

A solution of 1 g. of the monoacetate obtained according to Example XII in 40 cc. of pyridine was treated with 600 mg. of N-bromoacetamide which was added in small portions and maintaining the temperature at 20° C. After 24 hours standing at room temperature, the solution was diluted with water and the product was extracted with ether, washed with dilute hydrochloric acid, sodium bicarbonate and water, dried over sodium sulphate and evaporated to dryness. Crystallization of the residue from methanol yielded allopregnan-11α,17α-diol-3,20-dione 11-acetate.

We claim:

1. A process for the production of a compound selected from the group consisting of a pregnan-11α,17α-diol-3,20-dione lower fatty acid esters thereof and benzoic acid esters thereof which comprises treating a corresponding $\Delta^{16}$-pregnen-3,11α-diol-20-one compound with hydrogen peroxide in alkaline medium to produce the corresponding 16α,17α-oxido derivative and thereafter converting the 16α,17α-oxido group to a 17α-hydroxy group and the 3-hydroxy group to a 3-keto group.

2. The process of claim 1 wherein the 16α,17α-oxido group is first converted to a 17α-hydroxy group and the 3-hydroxy group is thereafter converted to a 3-keto group.

3. The process of claim 1 wherein the 3-hydroxy group is first converted to a 3-keto group and thereafter the 16α,17α-oxido group is converted to a 17α-hydroxy group.

4. A new compound selected from the class consisting of a pregnan-11α,17α-diol-3,20-dione 11-mono lower fatty acid ester thereof and 11-mono benzoic acid ester thereof.

5. Allopregnan-11α,17α-diol-3,20-dione 11-acetate.

6. Allopregnan-11α,17α-diol-3,20-dione.

No references cited.